United States Patent
Mabuchi

(10) Patent No.: US 12,027,832 B2
(45) Date of Patent: Jul. 2, 2024

(54) METHOD FOR REMOVING SHIELD FOIL AND SHIELD FOIL REMOVING DEVICE

(71) Applicant: Yazaki Corporation, Tokyo (JP)

(72) Inventor: Miyoshi Mabuchi, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 42 days.

(21) Appl. No.: 17/900,391

(22) Filed: Aug. 31, 2022

(65) Prior Publication Data
US 2023/0072308 A1 Mar. 9, 2023

(30) Foreign Application Priority Data
Sep. 6, 2021 (JP) ................ 2021-144892

(51) Int. Cl.
*H02G 1/12* (2006.01)
(52) U.S. Cl.
CPC .................... *H02G 1/12* (2013.01)
(58) Field of Classification Search
CPC ................ H02G 1/12; H02G 1/126
See application file for complete search history.

(56) References Cited

U.S. PATENT DOCUMENTS

| | | | | |
|---|---|---|---|---|
| 5,230,260 A * | 7/1993 | Bell | ............... | H02G 1/12 29/403.3 |
| 6,401,570 B1 * | 6/2002 | Nadeau | ............ | H02G 1/1204 81/9.4 |
| 7,228,763 B2 * | 6/2007 | Hughes | ............... | H02G 1/1248 81/9.51 |
| 8,544,364 B2 * | 10/2013 | Michaels | ........... | H02G 1/1226 81/9.51 |
| 2020/0136334 A1 * | 4/2020 | Mabuchi | ............... | H01R 43/28 |
| 2020/0194978 A1 * | 6/2020 | Symington | ........... | H02G 1/005 |
| 2023/0072308 A1 * | 3/2023 | Mabuchi | ............ | H02G 1/1285 |

FOREIGN PATENT DOCUMENTS

| | | | | |
|---|---|---|---|---|
| JP | H0615224 U | * | 2/1994 | |
| JP | 2003036902 A | * | 2/2003 | ............ H01R 4/242 |
| JP | 5247404 B2 | | 7/2013 | |
| WO | WO-9952188 A1 | * | 10/1999 | .......... H02G 1/1256 |

* cited by examiner

*Primary Examiner* — Jeffrey T Carley
(74) *Attorney, Agent, or Firm* — Sughrue Mion, PLLC

(57) ABSTRACT

A shield foil removing device includes an opening and closing chuck configured to accommodate two wire cores surrounded by a shield foil in a space having a rectangular cross section orthogonal to an electric wire longitudinal direction, which is formed by closing, in such a direction that a longitudinal direction of the rectangular space and an arrangement direction of the two wire cores in a cross section coincide with each other, compresses the shield foil in a direction orthogonal to an arrangement direction of the two wire cores by reducing the rectangular space by a closing operation, and brings the shield foil into close contact with outer peripheral surfaces of the two wire cores to secure a gap continuous in a longitudinal direction of the shielded electric wire between both of outer peripheral curved surfaces adjacent to each other of the two wire cores and the shield foil.

2 Claims, 7 Drawing Sheets

METHOD FOR REMOVING SHIELD FOIL AND SHIELD FOIL REMOVING DEVICE

CROSS REFERENCE TO RELATED APPLICATIONS

This application is based on and claims priority from Japanese patent application No. 2021-144892 filed on Sep. 6, 2021, the entire contents of which are incorporated herein by reference.

TECHNICAL FIELD

The present invention relates to a method for removing a shield foil at a terminal of a shielded electric wire and a shield foil removing device.

BACKGROUND ART

Among types of communication electric wires to be mounted on a vehicle or the like, there is a shielded electric wire having a structure in which an outer periphery of a wire core (each conductor covered with an insulator) is covered with a metal shield foil such as an aluminum foil or a copper foil for improving a communication performance, and an outer periphery of the shield foil is covered with an insulating sheath. In addition, there is also a shielded electric wire having a structure in which a braid is inserted between a shield foil and an insulating sheath as a further shield material.

When terminal processing such as processing for attaching a connector to a terminal of a shielded electric wire is performed on this type of shielded electric wire, it is necessary to peel of the exposed shield foil from the inner wire core after removing the insulating sheath (in the case where a braid is present inside the insulating sheath, after the braid is folded back to cover the insulating sheath). The shield foil is wound so as to be in close contact with a signal line (wire core), and it is necessary to remove the shield foil so as not to damage the signal line (wire core) at the time of removal.

In the related art, the shield foil in this type of shielded electric wire is removed by manually cutting off the shield foil after the insulating sheath is peeled off. However, the manual removal of the shield foil has difficulty in dimensional accuracy and quality, is troublesome in work, and is more difficult to perform manual work as the shielded electric wire becomes thinner.

Therefore. Patent Literature 1 discloses a technique for cutting a shield foil by pressing a tip end surface of a shielded electric wire from which an insulating sheath within a predetermined length range from a tip end is removed against a conical concave surface (tapered surface=funnel-shaped wall), bringing a chuck that holds an outer periphery of the insulating sheath close to the conical concave surface, expanding the shield foil and a wire core by a repulsive force from the concave surface, and bringing the shield foil into contact with a cutting edge of a cutting blade by a stroke of the expansion.

CITATION LIST

Patent Literature

Patent Literature 1: Japanese Patent No. 5247404

SUMMARY OF INVENTION

However, according to the technique described in Patent Literature 1, since an expanded shape of the shield foil is not necessarily constant, there is a possibility that the shield foil is left unpeeled due to insufficient cutting or the wire core is damaged due to excessive cutting. In addition, the technique described in Patent Literature 1 is considered to be able to be implemented with a hard coaxial wire, but in a multi-core type shielded electric wire using thin wire cores, the shield foil may not expand and may not be established. In particular, in a case where two wire cores are twisted and then surrounded by the shield foil, untwisting causes the shield foil to expand in an irregular shape, making it difficult to accurately cut the shield foil.

The present invention has been made in view of the above circumstances, and an object of the present invention is to provide a method for removing a shield foil and a shield foil removing device capable of accurately making a slit in a shield foil without damaging a wire core and peeling off the shield foil with a constant quality.

Solution to Problem

According to an embodiment of a method for removing a shield foil at a terminal of a shielded electric wire including two twisted wire cores, the shield foil surrounds an outer side of the two wire cores, and an insulating sheath covers an outer side of the shield foil. The method includes,
  a sheath removing step of removing the insulating sheath at the terminal of the shielded electric wire to expose the shield foil;
  a wire core untwisting step of untwisting the two wire cores from outside of the shield foil so that the two wire cores are parallel to each other from a root to a tip end of the exposed shield foil;
  a foil compressing step of accommodating the two wire cores surrounded by the shield foil in a space having a rectangular cross section orthogonal to an electric wire longitudinal direction, which is formed by closing an opening and closing chuck, in such a direction that a longitudinal direction of the rectangular space and an arrangement direction of the two wire cores in a cross section coincide with each other, compressing the shield foil from outside in a direction orthogonal to the arrangement direction of the two wire cores in the cross section by reducing the rectangular space, and bringing the shield foil into close contact with outer peripheral surfaces of the two wire cores in a direction orthogonal to the arrangement direction of the two wire cores in the cross section to secure a gap continuous in a longitudinal direction of the shielded electric wire between both of outer peripheral curved surfaces adjacent to each other of the two wire cores and the shield foil;
  a foil cutting step of abutting a cutting edge of a cutter on the shield foil from the outside at a position of the gap to make a slit in the shield foil along a longitudinal direction of the two wire cores; and
  a foil peeling step of peeling the shield foil with the slit from the two wire cores.

According to another embodiment of a shield foil removing device for removing a shield foil at a terminal of a shielded electric wire in which an insulating sheath at the terminal of the shielded electric wire is removed and two wire cores are parallel to each other from a root to a tip end of the exposed shield foil, the device includes:
  an opening and closing chuck openable and closable, and configured to accommodate two wire cores surrounded by the shield foil in a space having a rectangular cross section orthogonal to an electric wire longitudinal direction, which is formed by closing, in such a direction that a longitudinal direction of the rectangular space and an arrangement direction of the two wire cores in a cross section coincide with each other, compress the shield foil from outside in a direction orthogonal to an arrangement direction of the two wire cores in the cross section by reducing the rectangular space by a closing operation, and bring the shield foil into close contact with outer peripheral surfaces of the two wire cores to secure a gap continuous in a longitudinal direction of the shielded electric wire between both of outer peripheral curved surfaces adjacent to each other of the two wire cores and the shield foil.

BRIEF DESCRIPTION OF DRAWINGS

FIGS. 2A to 2F are side views illustrating all steps of the method for removing a shield foil according to the embodiment of the present invention, in which FIG. 2A is a view showing a state after a sheath removing step of exposing the shield foil, FIG. 2B is a view showing a state after a wire core untwisting step of untwisting two wire cores in the exposed shield foil, FIG. 2C is a view showing a state after a foil cutting step of making slits in the shield foil along an electric wire longitudinal direction by the cutter, FIG. 2D is a view showing a state after a foil peeling step of blowing air to the shield foil with the slits to peel off the shield foil from the wire cores, FIG. 2E is a view showing a state during the foil peeling step of blowing air to the shield foil with the slits to peel off the shield foil from the wire cores, and FIG. 2F is a view showing a state in which the shield foil peeled off from the wire cores is cut off.

FIGS. 3A to 3C are cross-sectional views orthogonal to the electric wire longitudinal direction illustrating the steps of the method for removing a shield foil, in which FIG. 3A is a view showing a state before the compressive force is applied to the shield foil by closing the opening and closing chuck, FIG. 3B is a view showing a state where the compressive force is started to be applied to the shield foil, and FIG. 3C is a view showing a state where the slits are made by the cutter in a state in which the opening and closing chuck is closed and the shield foil is compressed.

FIGS. 4A and 4B are views subsequent to FIGS. 3A to 3C, in which FIG. 4A is a view showing a state in which the slits are made in the shield foil by the cutting edges of the cutter, and FIG. 4B is a view showing a state in which the shield foil is peeled off from the wire cores by blowing air.

DESCRIPTION OF EMBODIMENTS

A specific embodiment of the present invention will be described below with reference to the drawings.

Figure 1:
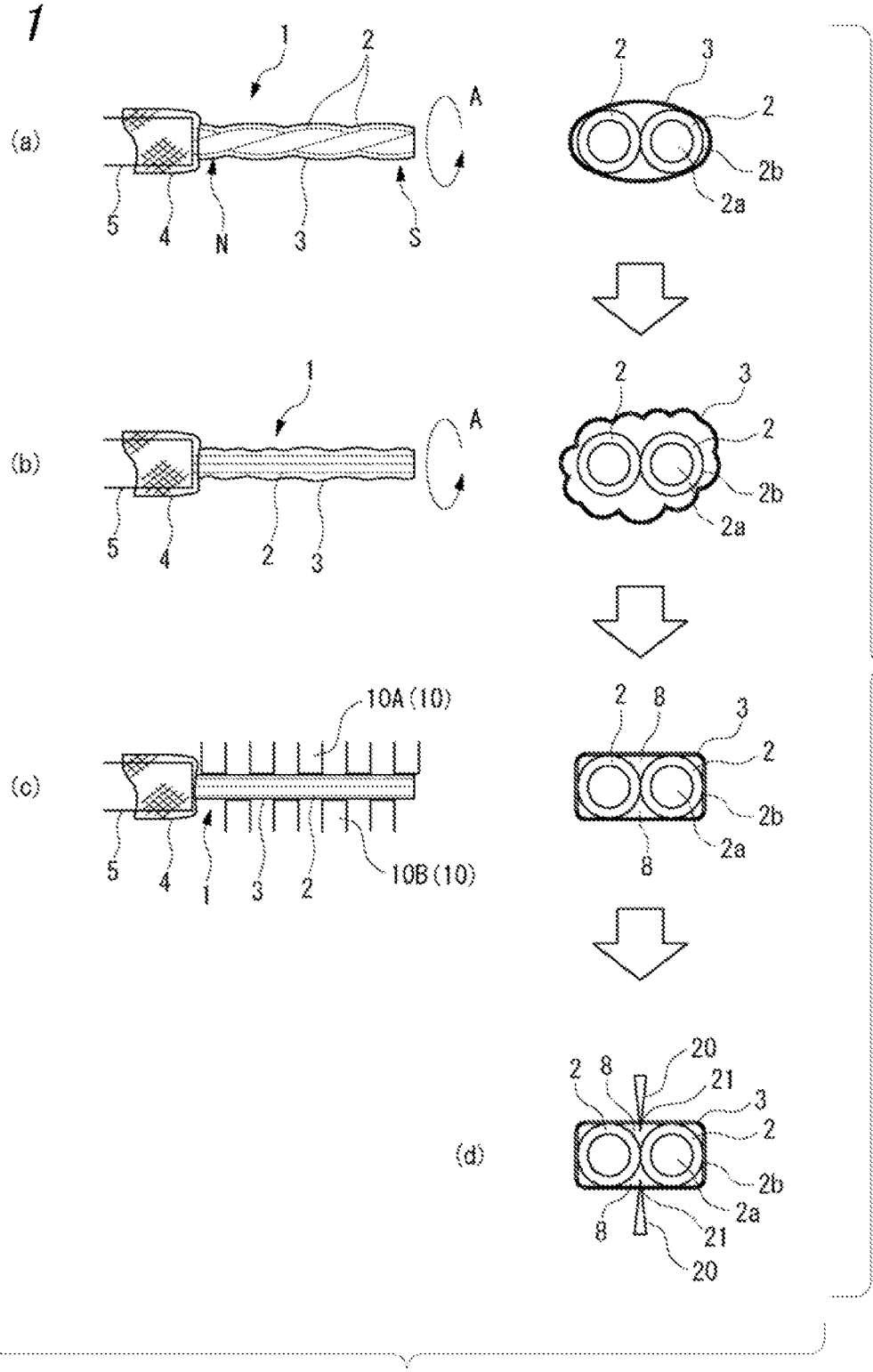
FIG. 1 is an explanatory view of partial steps of a method for removing a shield foil according to an embodiment of the present invention, in which (a) in FIG. 1 is a view showing a state in which a shield foil at a terminal of a shielded electric wire is exposed, (b) in FIG. 1 is a view showing a state in which two wire cores in the exposed shield foil are untwisted, (c) in FIG. 1 is a view showing a state in which a compressive force is applied to the shield foil by an opening and closing chuck, and (d) in FIG. 1 is a view showing a state in which cutting edges of a cutter are abutted on the shield foil from the outside.
Figure 2A:
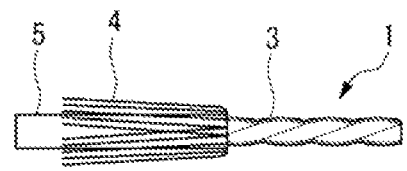
Figure 2B:
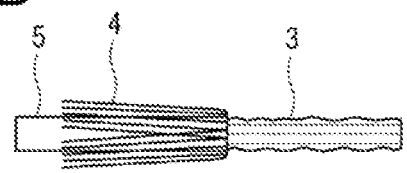
Figure 2C:
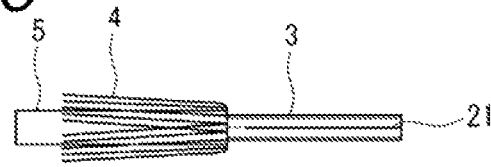
Figure 2E:
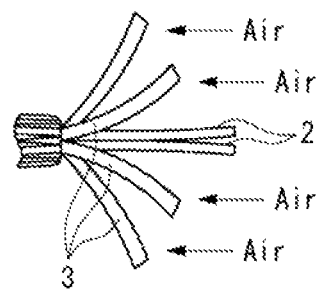
Figure 2D:
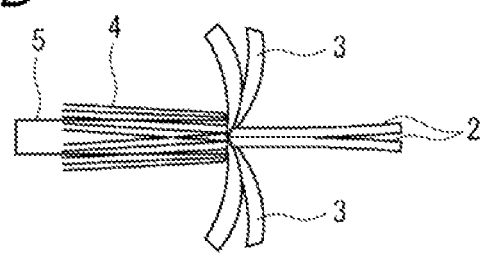
Figure 2F:
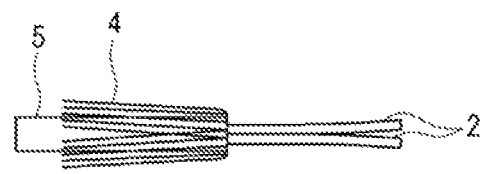

FIG. 1 is an explanatory view of partial steps of a method for removing a shield foil according to the present embodiment, and FIGS. 2A to 2F are side views illustrating all steps of the method for removing a shield foil. Noted that left side views of (a) to (c) in FIG. 1 are side views, and right side views of (a) to (c) in FIG. 1 and (d) in FIG. 1 are cross-sectional views as viewed from a tip end side of a shield foil and a wire core. FIG. 2A is a view showing a state after a sheath removing step of exposing the shield foil, FIG. 2B is a view showing a state after a wire core untwisting step of untwisting two wire cores in the exposed shield foil, FIG. 2C is a view showing a state after a foil cutting step of making slits in the shield foil along an electric wire longitudinal direction by the cutter, FIG. 2D is a view showing a state after a foil peeling step of blowing air to the shield foil with the slits to peel off the shield foil from the wire cores, FIG. 2E is a view showing a state during the foil peeling step of blowing air to the shield foil with the slits to peel off the shield foil from the wire cores, and FIG. 2F is a view showing a state in which the shield foil peeled off from the wire cores is cut off.

First, a shielded electric wire to be subjected to the method for removing a shield foil according to the present embodiment will be described.

As shown in (a) in FIG. 1, a shielded electric wire 1 used in the present embodiment has a structure in which a pair of wire cores 2 in which outer peripheries of conductors 2a formed of a stranded wire of annealed copper or the like are respectively covered with insulators 2b are surrounded with a shield foil 3 such as an aluminum foil or a copper foil in a state of being spirally twisted, an outer side of the shield foil 3 is covered with a braid 4, and an outer side of the braid 4 is covered with an insulating sheath 5. The shield foil 3 is formed by, for example, winding a tape-shaped metal foil around the outer peripheries of the two wire cores 2 in a spiral shape while partially overlapping adjacent metal foil.

As shown in (a) in FIG. 1 and FIG. 2A, in performing terminal processing, first, the insulating sheath 5 within a predetermined length range from a tip end of the shielded electric wire 1 is removed, and a folded portion of the braid 4 is covered from a tip end of the insulating sheath 5 to a base end side. As a result, the shield foil 3 is exposed within the predetermined length range from the tip ends of the insulating sheath 5 and the braid 4 (sheath removing step). Main terminal processing in the present embodiment is processing for peeling off the shield foil 3 within the predetermined length range from the wire cores 2.

After the sheath removing step, a step of untwisting the two wire cores 2 inside the exposed shield foil 3 (wire core untwisting step) is performed.

In this wire core untwisting step, first, a portion of the insulating sheath 5 at a terminal of the shielded electric wire 1 (base end side of the shielded electric wire 1) is held by an electric wire chuck (not shown). Then, the width of the shield foil 3 is measured by a sensor (not shown) at a position in a vicinity of a boundary between the insulating sheath 5 and the exposed shield foil 3, that is, in a vicinity of a root N of the exposed shield foil 3.

As the sensor, for example, a camera that captures an image of an outer surface of the shield foil 3 may be used. Then, an actuator that rotates the electric wire chuck rotates the shielded electric wire 1 around an axis, and stops the rotation at a rotation angle position of the shielded electric wire 1 at which a measured value indicating the width of the shield foil 3 becomes the maximum. Then, the width of the two wire cores 2 inside the shield foil 3 is also maximized, and the position at which the rotation is stopped corresponds to an arrangement direction of the two wire cores 2 at the root of the exposed shield foil 3. Then, with this position as a reference, a twist of the two wire cores 2 in the exposed shield foil 3 is untwisted.

In the untwisting step, first, the sensor detects the arrangement direction of the two wire cores 2 at a tip end S of the exposed shield foil 3. As the sensor, for example, a camera that captures an image of tip end surfaces of the shield foil 3 and the wire cores 2 in an axial direction can be used. An image processing device (not shown) acquires an image captured by the camera and detects the arrangement direction (that is, the arrangement) of the two wire cores 2 at the tip end of the shield foil 3. Then, based on detection data, tip end portions of the wire cores 2 are rotated from the outside of the shield foil 3 in a direction (arrow A direction) in which the twist of the wire cores 2 is loosened. That is, the tip end portions of the shield foil 3 and the wire cores 2 are held by a chuck and rotated with respect to the base end side (root N side) of the shielded electric wire 1.

The amount of rotation is determined in consideration of an amount by which the wire cores 2 return in a twisting direction due to a twisting tendency after the chuck at the tip end is opened, and is determined such that the arrangement directions of the wire cores 2 at the root N and the tip end S of the finally exposed shield foil 3 coincide with each other, and the two wire cores 2 from the root N to the tip end S of the exposed shield foil 3 are parallel to each other. In addition, a bending tendency of the two wire cores 2 from the root N to the tip end S of the exposed shield foil 3 may be corrected by a chuck that grips the tip end of the shield foil 3, a chuck that grips another portion, or the like, as necessary.

(b) in FIG. 1 and FIG. 2B show the untwisted state of the wire cores 2. When the twist of the two wire cores 2 are untwisted from the outside of the exposed shield foil 3, the shield foil 3 is expanded in an irregular shape as exaggeratedly shown in a cross-sectional view on a right side of (b) in FIG. 1. When cutting edges of the cutter abuts on the shield foil 3 in such an expanded state, the shield foil 3 may escape, and appropriate slits cannot be made in the shield foil 3. Therefore, before the slits are made, a next foil compression step is performed.

(c) in FIG. 1 shows a state in which the foil compression step is performed.

That is, in the foil compression step, as shown in (c) in FIG. 1, a compressive force is applied by opening and closing chucks 10A, 10B from the outside of the shield foil 3. As a result, gaps 8 that have each a substantially triangular cross section and are each continuous in the electric wire longitudinal direction are secured between both of outer peripheral curved surfaces adjacent to each other of the two wire cores 2 and the shield foil 3.

Figure 3A:
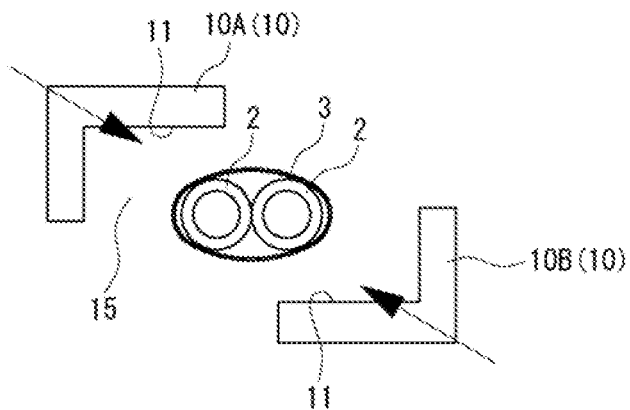
Figure 3B:
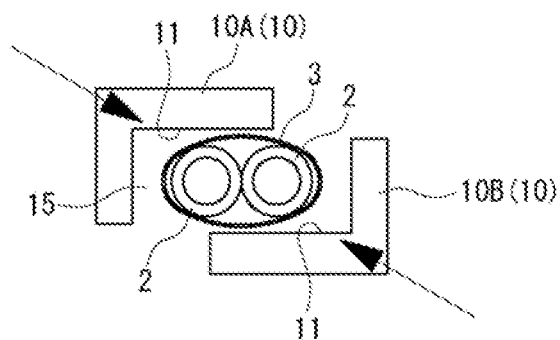
Figure 3C:
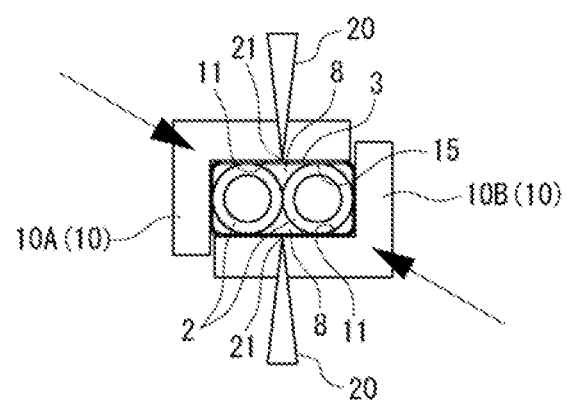

FIGS. 3A to 3C are cross-sectional views orthogonal to the electric wire longitudinal direction, in which FIG. 3A is a view showing a state before the compressive force is applied to the shield foil 3 by closing the opening and closing chuck 10 (10A, 10B), FIG. 3B is a view showing a state where the compressive force is started to be applied to the shield foil 3, and FIG. 3C is a view showing a state where slits 21 are made by a cutter 20 in a state in which the opening and closing chuck 10 (10A, 10B) is closed and the shield foil 3 is compressed. In the following description, the opening and closing chuck 10A and the opening and closing chuck 10B will be described as the opening and closing chuck 10 when it is not necessary to distinguish between them.

As shown in FIGS. 3A to 3C, the opening and closing chuck 10 is openable and closable, and accommodates the exposed shield foil 3 in the expanded state due to untwisting of the wire cores 2 and the two wire cores 2 surrounded by the shield foil 3, in a space 15 having a rectangular cross section orthogonal to the electric wire longitudinal direction, which is formed by closing in directions indicated by arrows in FIGS. 3A to 3C.

However, the opening and closing chuck 10 accommodates the shield foil 3 and the wire cores 2 in a state in which a longitudinal direction of a rectangular space and the arrangement direction of the two wire cores 2 in a cross section are adjusted to coincide with each other. That is, since the cross sections of the two wire cores 2 have a substantially elliptical shape, a rotation posture of the opening and closing chuck 10 is adjusted so that the longest direction of the elliptical shape coincides with the longitudinal direction of the rectangular space, and the shield foil 3 and the two wire cores 2 are gripped while being accommodated. At this time, the arrangement direction of the two wire cores 2 (a long axis direction of the ellipse) is confirmed by an image processing unit (not shown) acquiring an image captured by the camera.

That is, a shield foil removing device according to the present embodiment includes, around the opening and closing chuck 10, a sensor that measures a width dimension of the exposed shield foil 3 on the root N side, and a camera that acquires an captured image of the tip end S surfaces of the two wire cores 2 surrounded by the exposed shield foil 3. In the foil compression step, the direction of the shielded electric wire 1 in the cross section is adjusted by measuring the width dimension of the exposed shield foil 3 on the root side by a sensor. In addition, a direction of gripping the tip end of the exposed shield foil 3 and the two wire cores 2 is adjusted by the opening and closing chuck 10 by the image of the tip end surfaces of the two wire cores 2 surrounded by the exposed shield foil 3 captured by the camera.

Then, the rotation posture of the opening and closing chuck 10 is adjusted so that the arrangement directions of the two wire cores 2 at a position of the root N and a position of the tip end S of the exposed shield foil 3 coincide with each other and the two wire cores 2 from the root N to the tip end S of the exposed shield foil 3 are parallel to each other, and the opening and closing chuck 10 is closed (the operation of the arrows in FIGS. 3A and 3B) to reduce the rectangular space 15. Then, the expanded shield foil 3 is compressed from the outside in a direction orthogonal to the arrangement direction of the two wire cores 2 in the cross section, and is brought into close contact with outer peripheral surfaces of the two wire cores 2. As a result, the gaps 8 that have each a substantially triangular cross section and are each continuous in the longitudinal direction of the shielded electric wire 1 are secured between the shield foil 3 and both of the outer peripheral curved surfaces adjacent to each other of the two wire cores 2. In the foil compression step, flat pressing surfaces 11 (see FIG. 3C) of the opening and closing chuck 10 parallel to each other uniformly press the shield foil 3 against the outer peripheral surfaces of the two wire cores 2.

The opening and closing chuck 10 also has a function of sandwiching the entire two wire cores 2 in the longitudinal direction and correcting bending of the two wire cores 2.

Next, when the compression of the shield foil 3 is completed, the foil cutting step is performed.

That is, as shown in (d) in FIG. 1 and FIG. 3C, the cutting edges of the cutter 20 are abutted on the shield foil 3 from the outside at the positions of the gaps 8 having a substantially triangular cross section secured between the shield foil 3 and both of the outer peripheral curved surfaces adjacent to each other of the two wire cores 2, and the slits 21 are made in the shield foil 3 along the longitudinal direction of the two wire cores 2 (the state of FIG. 2C).

Figure 4A:
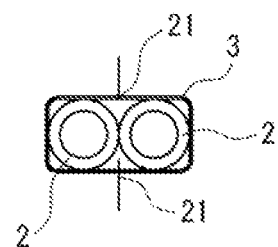

After the slits 21 are made (the state of FIG. 4A), the opening and closing chuck 10 is opened, and the foil peeling step is performed.

Figure 4B:
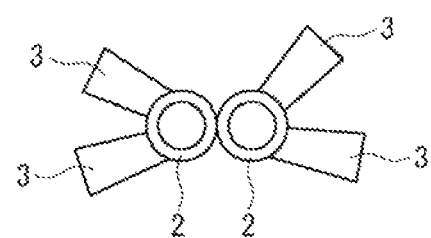

That is, as shown in FIG. 2E, air Air is blown toward the inside of the shield foil 3 in which the slits 21 are made, and as shown in FIG. 2D and FIG. 4B, the shield foil 3 is peeled off from the two wire cores 2. At this time, due to the presence of the slits 21, the shield foil 3 is easily peeled off from the wire cores 2. Instead of blowing air, the shield foil 3 may be peeled off with a brush or the like.

The peeled shield foil 3 spreads in a state of being connected to the shield foil on an inner side of the insulating sheath 5. Therefore, in a next foil separating step, the peeled shield foil 3 is cut off. That is, a chuck (not shown) grips the peeled shield foil 3, and pulls the shield foil 3 in a certain direction of the insulating sheath 5 to cut off the shield foil 3 (state shown in FIG. 2F). Therefore, a step of removing the shield foil 3 ends.

Figure 5:
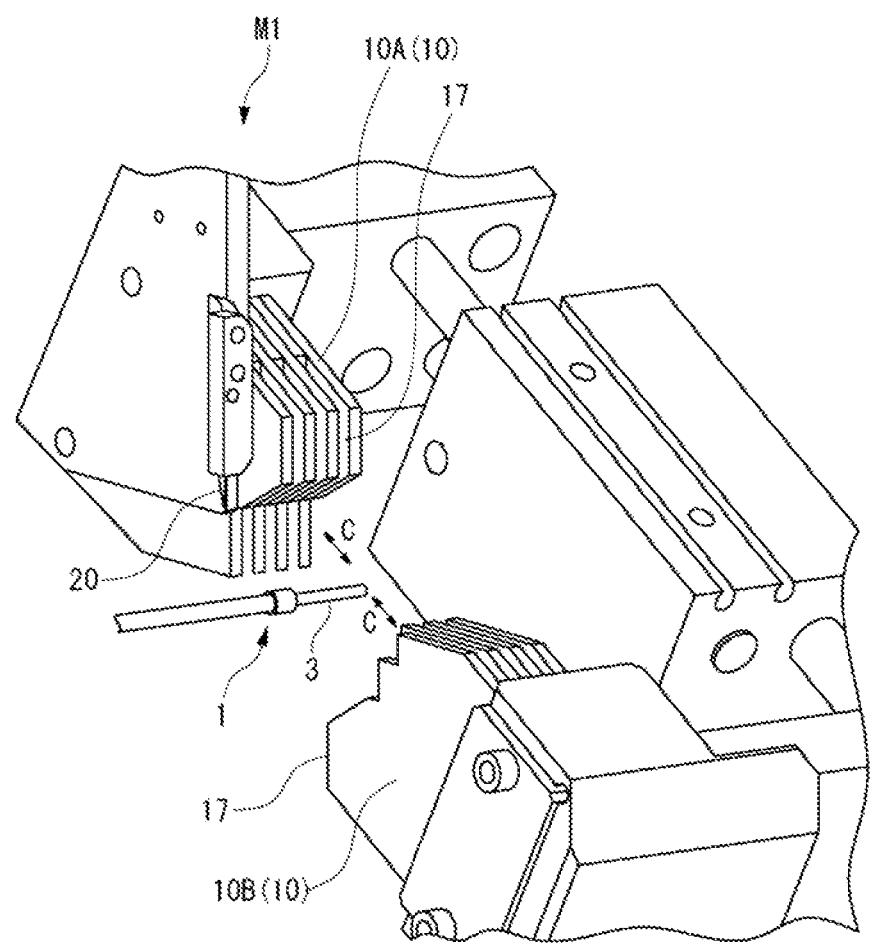
FIG. 5 is a perspective view showing a partial configuration of a shield foil removing device including the opening and closing chuck.
Figure 6:
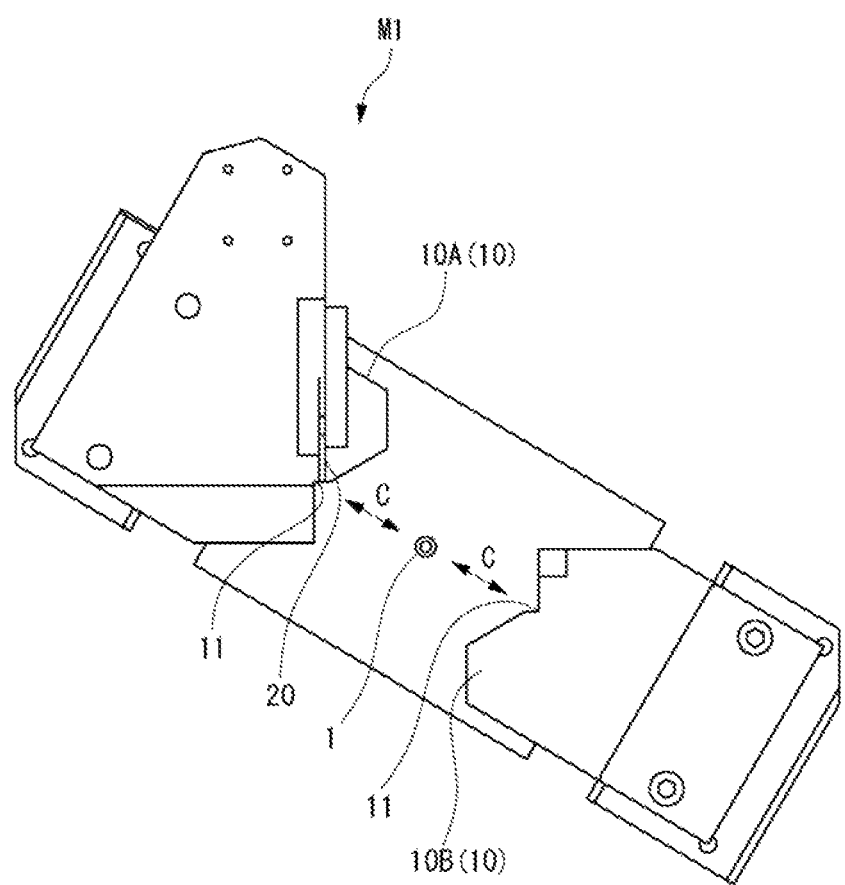
FIG. 6 is a front view (in the electric wire longitudinal direction) of an opening and closing chuck portion of the shield foil removing device.
Figure 7:
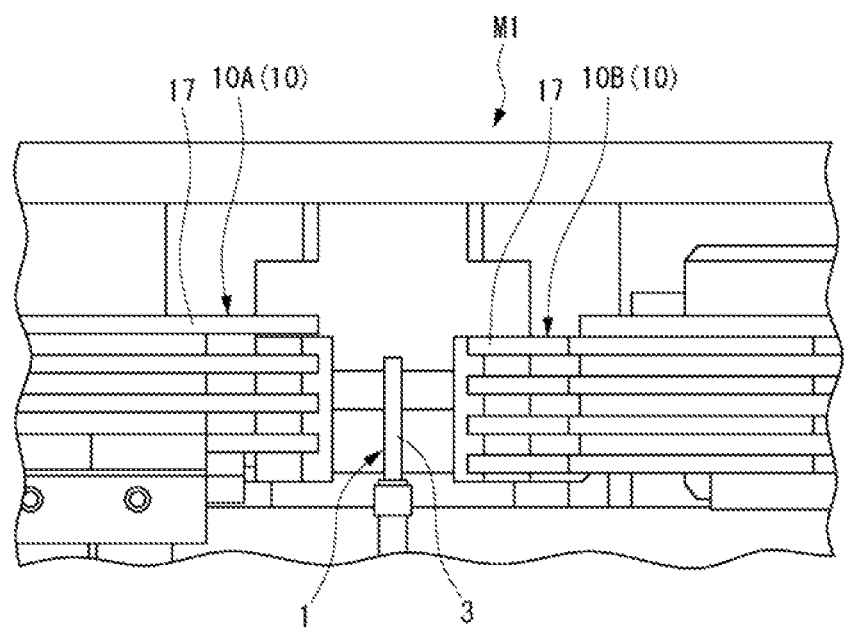
FIG. 7 is a top view of the opening and closing chuck portion of the shield foil removing device.

Among the above steps, an example of a portion of a device for performing the foil compression step is shown in FIGS. 5 to 7.

FIG. 5 is a perspective view showing a partial configuration of the shield foil removing device including the opening and closing chuck, FIG. 6 is a front view of the opening and closing chuck portion of the device (the electric wire longitudinal direction), and FIG. 7 is a top view of the opening and closing chuck portion of the device.

As shown in FIGS. 5 to 7, the opening and closing chuck 10 includes a pair of chucks 10A, 10B arranged symmetrically with the shielded electric wire 1 to be operated interposed therebetween. The chucks 10A, 10B are opened and closed by symmetrically approaching and separating from the shielded electric wire 1 held at a fixed position as indicated by arrows C. The pair of chucks 10A, 10B are configured by arranging a plurality of compression plates 17 at intervals in the axial direction of the shielded electric wire 1. The compression plates 17 of the chuck 10A (one) and the compression plates 17 of the chuck 10B (other one) are alternately arranged in the axial direction of the shielded electric wire 1. Further, by closing the pair of chucks 10A, 10B, the rectangular space 15 for accommodating the shield foil 3 and the two wire cores 2 is formed as shown in FIG. 3C. In addition, the one compression plate 17 of the chuck 10A is provided with the cutter 20 capable of projecting and retracting from the compression plate 17 in the direction of the shield foil 3, so that the slits are made in the shield foil 3 when necessary.

As described above, according to the method for removing a shield foil of the present embodiment, since the cutting edges of the cutter 20 are abutted on the shield foil 3 compressed from the outside and brought into close contact with the wire core 2, compared with a case where the slits are made in the shield foil while the shield foil 3 is expanded as in the related art, the shield foil 3 does not escape, and the cutting edges can be stably and reliably made to bite into the shield foil 3. In addition, since the cutting edges of the cutter are abutted on the shield foil 3 at the positions of the gaps 8 having a substantially triangular cross section secured between both of the outer peripheral curved surfaces of the two wire cores 2 untwisted and held in parallel to each other and the shield foil 3, the slits can be made in the shield foil 3 without damaging the wire cores 2 while inserting the cutting edges into the gaps 8 having a substantially triangular cross section. Therefore, the shield foil 3 surrounding the outer sides of the twisted wire cores 2 can be removed with a stable quality.

Since the slits 21 in the shield foil 3 can be made along the electric wire longitudinal direction from the root N to the tip end S of the exposed shield foil 3, the shield foil 3 can be separated at a fixed position near a cut end of the insulating sheath 5. As a result, it is possible to shorten the length of an electrically exposed portion, improve a connection quality with respect to a connector, and contribute to an improvement of the electrical characteristics of the connector.

Although manual work becomes more difficult as the shielded electric wire 1 becomes thinner, the wire core untwisting step, the foil compressing step, the foil cutting step, and the foil peeling step as well as the sheath removing step can be automated, so that all steps can be automated.

Since the arrangement directions of the two wire cores 2 at the root N and the tip end S of the exposed shield foil 3 are adjusted based on the data of the sensor or the camera, it is possible to make the slits 21 by the cutter 20 without damaging the wire cores 2 while maintaining the two wire cores 2 in a state of being parallel to each other with high accuracy.

Noted that the present invention is not limited to the embodiment described above, and modifications, improvements, and the like can be made as appropriate. In addition, materials, shapes, dimensions, numbers, arrangement positions, and the like of the respective constituent elements in the above-described embodiment are optional and are not limited as long as the present invention can be achieved.

According to an embodiment of a method for removing a shield foil (3) at a terminal of a shielded electric wire (1) including two twisted wire cores (2), the shield foil (3) surrounds an outer side of the two wire cores (2), and an insulating sheath (5) covers an outer side of the shield foil (3). The method includes, a sheath removing step of removing the insulating sheath (5) at the terminal of the shielded electric wire (1) to expose the shield foil (3);

a wire core untwisting step of untwisting the two wire cores (2) from outside of the shield foil (3) so that the two wire cores (2) are parallel to each other from a root (N) to a tip end (S) of the exposed shield foil (3);

a foil compressing step of accommodating the two wire cores (2) surrounded by the shield foil (3) in a space (15) having a rectangular cross section orthogonal to an electric wire longitudinal direction, which is formed by closing an opening and closing chuck (10, 10A, 10B), in such a direction that a longitudinal direction of the rectangular space (15) and an arrangement direction of the two wire cores (2) in a cross section coincide with each other, compressing the shield foil (3) from outside in a direction orthogonal to the arrangement direction of the two wire cores (2) in the cross section by reducing the rectangular space (15), and bringing the shield foil (3) into close contact with outer peripheral surfaces of the two wire cores (2) in a direction orthogonal to the arrangement direction of the two wire cores (2) in the cross section to secure a gap (8) continuous in a longitudinal direction of the shielded electric wire (1) between both of outer peripheral curved surfaces adjacent to each other of the two wire cores (2) and the shield foil (3);

a foil cutting step of abutting a cutting edge of a cutter (20) on the shield foil (3) from the outside at a position of the gap (8) to make a slit (21) in the shield foil (3) along a longitudinal direction of the two wire cores (2); and a foil peeling step of peeling the shield foil (3) with the slit (21) from the two wire cores (2).

According to the method for removing a shield foil having the configuration of the above, since the cutting edge of the cutter is abutted on the shield foil compressed from the outside and brought into close contact with the wire core, unlike a case where the cutting edge of the cutter is abutted on the shield foil in a state where the shield foil is expanded, the shield foil does not escape, and the cutting edge can be stably and reliably made to bite into the shield foil. In addition, since the cutting edge of the cutter is abutted on the shield foil at the position of the gap having a substantially triangular cross section secured between both of the outer peripheral curved surfaces of the two wire cores untwisted and held in parallel to each other and the shield foil, the slit can be made in the shield foil without damaging the wire cores while inserting the cutting edge into the gap having a substantially triangular cross section. Therefore, the shield foil surrounding the outer sides of the twisted wire cores can be removed with a stable quality.

In addition, since the slit in the shield foil can be made along the electric wire longitudinal direction from the root to the tip end of the exposed shield foil, the shield foil can be separated at a fixed position near a cut end of the insulating sheath. As a result, it is possible to shorten the length of an electrically exposed portion, improve a connection quality with respect to a connector, and contribute to an improvement of the electrical characteristics of the connector. Although manual work becomes more difficult as the shielded electric wire becomes thinner, the wire core untwisting step, the foil compressing step, the foil cutting step, and the foil peeling step as well as the sheath removing step can be automated, so that all steps can be automated.

In the method for removing a shield foil according to the above, in the foil compression step, a direction of the shielded electric wire (1) in the cross section may be adjusted by measuring a width dimension of the exposed shield foil (3) on a root (N) side, and a direction in which the opening and closing chuck (10, 10A, 10B) grips the exposed shield foil (3) may be adjusted based on a captured image of tip end surfaces of the two wire cores (2) surrounded by the exposed shield foil (3).

According to the method for removing a shield foil having the configuration of the above, since the arrangement direction of the two wire cores (the longitudinal direction of the two wire cores in the cross section) between the root and the tip end of the exposed shield foil is adjusted, it is possible to make the slit in the shield foil by the cutter without damaging the wire cores while maintaining the two wire cores in a state of being parallel to each other with high accuracy.

According to another embodiment of a shield foil removing device for removing a shield foil (3) at a terminal of a shielded electric wire (1) in which an insulating sheath (5) at the terminal of the shielded electric wire (1) is removed and two wire cores (2) are parallel to each other from a root (N) to a tip end (S) of the exposed shield foil (3), the device includes, an opening and closing chuck (10, 10A, 10B) openable and closable, and configured to accommodate two wire cores (2) surrounded by the shield foil (3) in a space (15) having a rectangular cross section orthogonal to an electric wire longitudinal direction, which is formed by closing, in such a direction that a longitudinal direction of the rectangular space (15) and an arrangement direction of the two wire cores (2) in a cross section coincide with each other, compress the shield foil (3) from outside in a direction orthogonal to an arrangement direction of the two wire cores (2) in the cross section by reducing the rectangular space (15) by a closing operation, and bring the shield foil (3) into close contact with outer peripheral surfaces of the two wire cores (2) to secure a gap (8) continuous in a longitudinal direction of the shielded electric wire (1) between both of outer peripheral curved surfaces adjacent to each other of the two wire cores (2) and the shield foil (3).

According to the shield foil removing device having the configuration of the above, the foil compressing step can be performed by the opening and closing chuck, and it is possible to prepare to make a slit in the shield foil without damaging the wire core in the next foil cutting step.

The shield foil removing device according to the above may further include, a cutter (20) configured to cause a cutting edge to abut on the shield foil (3) from the outside at a position of the gap (8) to make a slit (21) in the shield foil (3) along a longitudinal direction of the two wire cores (2).

According to the shield foil removing device having the configuration of the above, the foil cutting step can be performed with the cutter.

The shield foil removing device according to the above may further include, a sensor configured to, when the exposed shield foil (3) is gripped by the opening and closing chuck (10, 10A, 10B), measure a width dimension of the exposed shield foil (3) on a root (N) side; and a camera configured to acquire a captured image of tip end surfaces of the two wire cores (2) surrounded by the exposed shield foil (3).

According to the shield foil removing device having the configuration of the above, the arrangement direction of the two wire cores can be detected at the positions of the root and the tip end of the exposed shield foil based on the detection result of the sensor and the captured image of the camera. Therefore, by reflecting these detection results in a holding posture of a holding chuck of the insulating sheath and a holding posture of the opening and closing chuck for gripping the shield foil, it is possible to make the slit in the shield foil by the cutter without damaging the wire cores while maintaining the two wire cores in a state of being parallel to each other with high accuracy from the root to the tip end of the shield foil.

According to the present invention, the slit can be accurately made in the shield foil without damaging the wire cores, and the shield foil can be peeled off with a constant quality. In addition, the shield foil can be cut off at a fixed position near the cut end of the insulating sheath. In addition, even when the shielded electric wire is thinned, automation can be achieved.

What is claimed is:

1. A method for removing a shield foil at a terminal of a shielded electric wire including two twisted wire cores, the shield foil surrounding an outer side of the two wire cores, and an insulating sheath covering an outer side of the shield foil, the method comprising:

removing the insulating sheath at the terminal of the shielded electric wire to expose the shield foil;

untwisting the two wire cores from outside of the shield foil so that the two wire cores are parallel to each other from a root to a tip end of the exposed shield foil;

compressing the shield foil by accommodating the two wire cores surrounded by the shield foil in a space having a rectangular cross section orthogonal to an electric wire longitudinal direction, which is formed by closing an opening and closing chuck, in such a direction that a longitudinal direction of the rectangular space and an arrangement direction of the two wire cores in a cross section coincide with each other, compressing the shield foil from outside in a direction orthogonal to the arrangement direction of the two wire cores in the cross section by reducing the rectangular space, and bringing the shield foil into close contact with outer peripheral surfaces of the two wire cores in a direction orthogonal to the arrangement direction of the two wire cores in the cross section to secure a gap continuous in a longitudinal direction of the shielded electric wire between both of outer peripheral curved surfaces adjacent to each other of the two wire cores and the shield foil;

abutting a cutting edge of a cutter on the shield foil from the outside at a position of the gap to make a slit in the shield foil along a longitudinal direction of the two wire cores; and peeling the shield foil with the slit from the two wire cores.

2. The method for removing a shield foil according to claim 1, wherein in the compressing of the shield foil, an orientation of the shielded electric wire in the cross section is adjusted by measuring a width dimension of the exposed shield foil on a root side, and an orientation in which the opening and closing chuck grips the exposed shield foil is adjusted based on a captured image of tip end surfaces of the two wire cores surrounded by the exposed shield foil.

* * * * *